3,671,158
Patented June 20, 1972

1

3,671,158
MOULDING OF GRAMOPHONE RECORDS
Walter Leslie Rand, Gerrards Cross, and John Ernest Simmons, Ruislip, England, assignors to EMI Limited, Hayes, Middlesex, England
Filed Mar. 26, 1970, Ser. No. 22,952
Claims priority, application Great Britain, Mar. 26, 1969, 15,700/69
Int. Cl. B29d 17/00
U.S. Cl. 425—129
9 Claims

ABSTRACT OF THE DISCLOSURE

Gramophone records are moulded by a combined injection-compression process. Mouldable material is injected into the mould prior to final closing of the mould. The tip of the injection nozzle extends into the mould cavity and when the final closing of the mould occurs, a counterpiece and the nozzle tip close together intermediate the record surfaces to form the centre hole in the record. A poppet valve in the centre region of each mould part is open prior to the injection step and a record label is held at the centre of each mould part by suction applied to the valve opening. The pressure of the injected material is sufficient to close the valves which are spring biased to their open positions.

---

This invention relates to the moulding of gramophone records.

In the manufacture of gramophone records it is necessary to ensure that the labels therefor are concentrically positioned in relation to the record. In the moulding operation, especially in injection moulding, steps must be taken to support the labels in position and to prevent the moulding material getting between the label and the mould surface.

It is an object of the present invention to provide improved apparatus for moulding gramophone records.

According to one aspect of the invention there is provided apparatus for moulding gramophone records including two separable mould parts, an opening in the centre region of one mould part, means for connecting said opening to suction means and a poppet valve for sealing said opening, the arrangement being such that with said opening connected to the suction means a label is held in position at the centre of said one mould part during the introduction of mouldable material between said mould parts, said valve subsequently being closed.

According to another aspect of the invention there is provided apparatus for moulding gramophone records including two separable mould parts which define a mould cavity when not separated, a nozzle for introducing for introducing mouldable material between said mould parts, said nozzle having an axial bore therethrough terminating in an open end with the tip of said nozzle extending into said cavity, a counterpiece co-operable with said nozzle tip, and means operable after the introduction of an appropriate quantity of mouldable material between said mould parts for causing said nozzle tip and said counterpiece to close together intermediate the surfaces of a record to form the centre hole in the record.

According to a further aspect of the invention there is provided apparatus for moulding gramophone records including two separable mould parts which define a mould cavity when not separated, a nozzle for introducing mouldable material between said mould parts, said nozzle having an axial bore therethrough terminating in an open end with the tip of said nozzle extending into said cavity, a counterpiece co-operable with said nozzle tip, means for causing one mould part to approach the other mould

2 part without the mould parts closing together, means operable after the introduction of an appropriate quantity of material between said mould parts for causing said mould parts to close together and means for causing the closing together of said nozzle tip and said counterpiece intermediate the surfaces of a record to form the centre hole in the record.

In order that the present invention may be clearly understood and readily carried into effect it will now be described by way of example with reference to the accompanying drawings in which.

Figure 1:
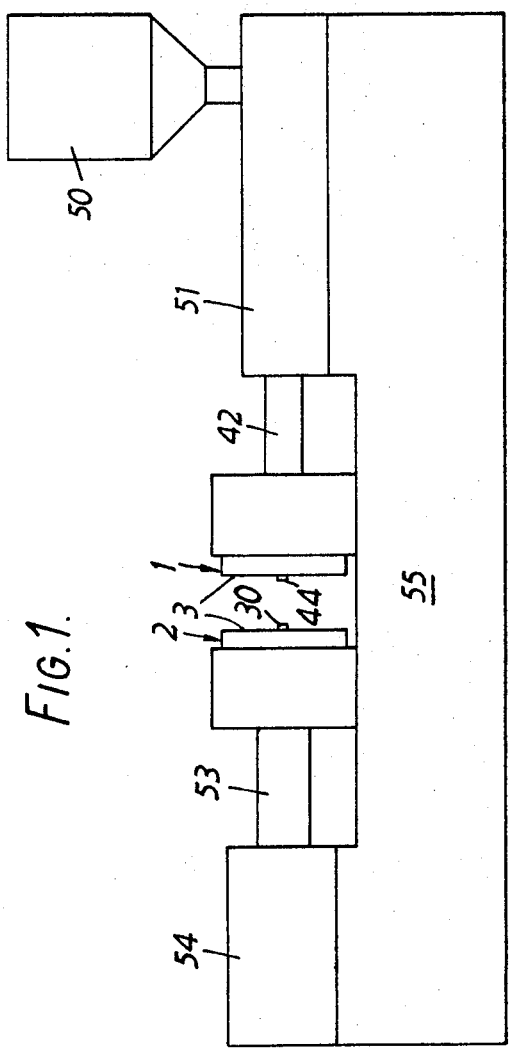
FIG. 1 illustrates schematically apparatus for moulding gramophone records.

Referring to FIG. 1 of the drawings, reference numerals 1 and 2 indicate generally the fixed and movable mould parts respectively. A hopper 50 contains a supply of record material in granular form which is fed into a heater and screw feeder 51. The heater produces only the initial softening of the granular material which is maintained in a softened state by the energy supplied by the screw feeder. The movable mould part 2 is reciprocated along guides (not shown) by a ram 53 under the influence of a hydraulic cylinder 54. The mouldable material is introduced through the centre of the fixed mould part 1. The various parts of the apparatus are mounted on a bed 55.

Figure 2:
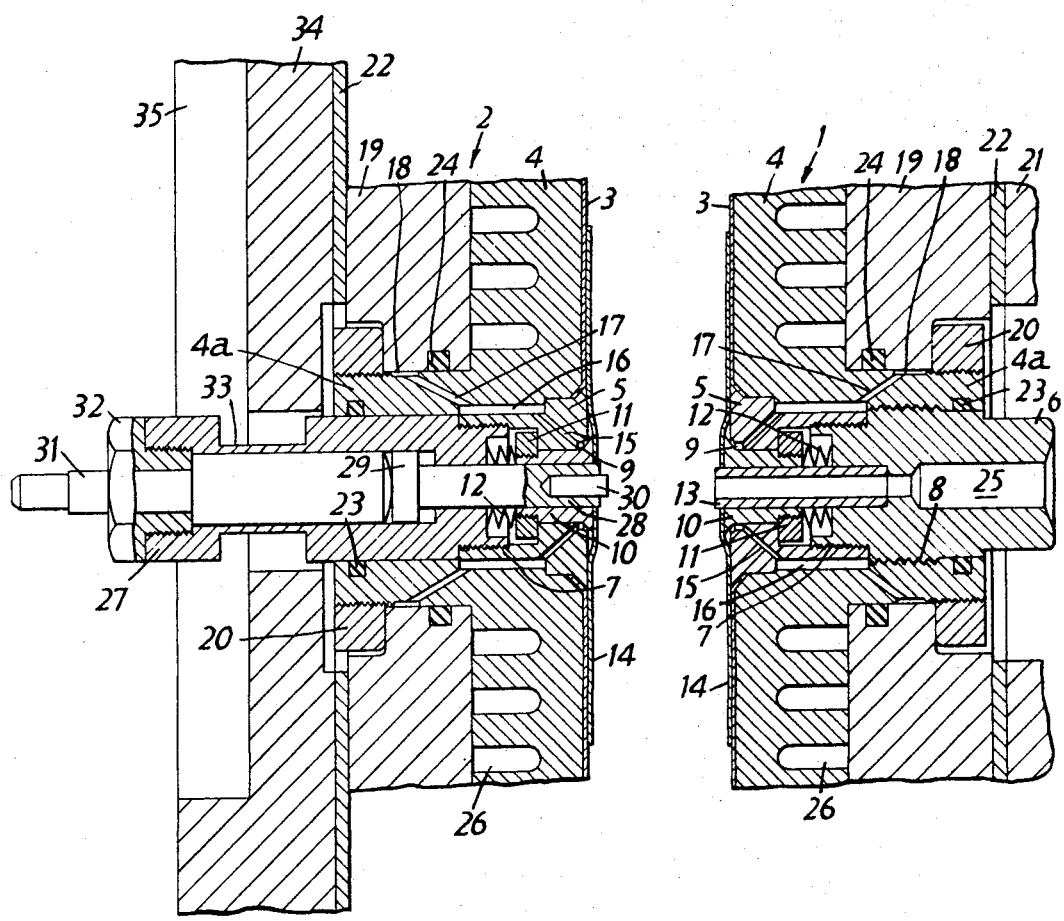
FIG. 2 illustrates diagrammatically in cross-section the centre portions of the mould parts of FIG. 1.

Referring now particularly to FIG. 2, the fixed mould part 1 includes a stamper disc 3 which carries the tracks to be produced on the record. The stamper disc 3 is clamped at the centre to the front surface of a bolster plate 4 by a clamping member 5. In the clamped position the front surfaces of stamper 3 and clamping member 5 are co-planar. A retaining member 6 is screw-threaded at 7 to clamping member 5 and screw-threaded at 8 to a rearwardly extending cylindrical portion 4a of the bolster plate 4. Clamping member 5 has an opening 9 having a conical portion with which a closure member in the form of a poppet valve 10 co-operates to seal the opening 9. With the valve 10 in position in the open condition, the opening 9 is in the form of an annulus. When valve 10 is in its sealing position, the front surfaces of clamping member 5 and valve 10 are co-planar. Valve 10 is a sliding fit in a bore in clamping member 5 and is held captive thereto by means of a nut 11 screwed to the rear stem portion of the valve 10, the nut 11 co-operating with a shoulder on clamping member 5 to limit the forward movement of the valve. The valve is biased towards its forward, that is its open, position by five dished spring washers 12 acting against a surface of retaining member 6. The amount of movement of valve 10 from its sealing to its fully open position is in the range 0.010 to 0.020 inch. A tubular member 13 of a diameter equal to that of the central hole of a record passes down the centre of valve 10 and is a force fit in an aperture in retaining member 6.

Valve 10 slides relative to tube 13 which is of such a length that with the valve 10 fully open it extends forwardly of the front surface of the valve by a small amount. The projecting portion of the tube 13 provides locating means for a record label 14. The label 14 is held in position by suction applied to the opening 9 through a plurality of passages 15, 16, 17 and 18. The means for applying the suction to passage 18 are not shown but are in themselves known.

The bolster plate 4 is secured to a plate 19 by a nut 20 screw-threaded to the cylindrical extension 4a of the bolster plate. The plate 19 is in turn secured, by means not shown, to a support 21 with the interposition of a sheet 22 of a resilient material. Sealing gaskets 23 and 24, preferably in the form of O-rings, are positioned respectively between members 4a and 6 and between members 4a and 19. The member 6 has a bore 25 for the introduction therethrough and through tube 13 of moulding material into the moulding space. The rear surface of bolster plate 4 is provided with channels 26 which co-operate with the surface of plate 19 to form passageways for the circulation of heating and/or cooling fluids in known manner.

The movable mould part 2 is of a somewhat similar construction to the fixed mould part 1 and similar parts are indicated by the same reference numerals. The securing means for the clamping member 5 is different and comprises a tubular member 27 screw-threaded to member 5 at 7. The tubular retainer member 27 has a portion 33 of reduced external diameter. A support 34 has a cutaway portion 35 for the introduction of a bifurcated member (not shown). The bifurcated member passes around the reduced diameter portion 33 of tubular member 27 and is of tapered thickness so as to force tubular member 27 rearwardly and hence cause clamping member 5 to firmly clamp the stamper disc 3 against bolster plate 4.

Sliding in the bore of tubular retainer member 27 and valve 10 is a rod 28 having a portion 29 of increased diameter co-operating with a shoulder in the bore of member 27 to act as a stop. The diameter of rod 28 is equal to the diameter of the central hole in a gramophone record and extends forwardly of fully opened valve 10 to provide locating means for a record label 14. Rod 28 has an insert 30 protruding centrally from its front end and of a diameter such as to be a sliding fit in the bore of tubular member 13 in mould part 1. A pusher rod 31 has a portion slidable in the bore in member 27 and held captive therein by a nut 32.

The operating cycle will now be described for the manufacture of a gramophone record. With the mould parts 1 and 2 separated, the openings 9 are open due to the influence of the biasing springs 12 on the valves 10. Record labels are presented to the centres of the mould parts by means not shown and suction applied to the openings 9 to cause the labels to be held on the locating members 13 and 28 as illustrated in FIG. 2 of the drawing. The mould part 2 moves towards the mould part 1 to a position where the distance between the stamper discs 3 is about ⅛ inch greater than the required thickness of a gramophone record. The amount of moulding material necessary for a record is then injected through bore 25 and tube 13 into the moulding space. The pressure exerted by the material entering and flowing radially outwardly of the moulding space is sufficient to overcome the force exerted by the biasing springs 12 on the valves 10 which are therefore moved to seal the openings 9. In this position the outer surfaces of the valves 10 and the clamping members 5 are co-planar and form a substantially smooth surface. The final moulding operation comprises moving the mould part 2 the remaining ⅛ inch or so towards the mould part 1. At the same time pusher rod 31 is operated by a hydraulic cylinder to move rod 28 until it contacts tube 13 and insert 30 enters the bore in tube 13, thus forming the central hole in the record. The final forming of the record is thus effected by pressure moulding during which time a heating and cooling cycle is carried out by introducing heating and cooling fluids into the channels 26 in known manner. The pressure moulding step ensures that the moulding material exactly conforms to the profiles of the stamper discs.

After completion of the pressing operation the mould part 2 moves away from mould part 1 and during the initial separation, the suction opening 9 in mould part 1 only is terminated and instead the opening is connected either to atmosphere or to a source of pressurised air. Valve 10 in mould part 1 moves under the influence of its biasing spring 12 to initiate separation of the record from the mould part 1 which is also assisted by the air entering through opening 9. The record is thus retained on and moves with mould part 2 from which it is removed as by suction means, the suction to opening 9 being replaced by atmospheric or pressurized air.

It will be seen from the foregoing description that means have been provided which not only locate and hold the record labels to the mould parts, but which also ensure that the record is released from a particular mould part when the mould opens. Also, it is unlikely that moulding material will get between a label and the mould part on which it is held.

Modifications may be made in the arrangement described, for example the actuating springs 12 may comprise helical compression springs, or the openings 9 and valves 10 may be replaced by other suitable openings and closure means therefor.

What we claim is:

1. Apparatus for moulding gramophone records including two separable mould parts, an opening in the centre region of one mould part, means for connecting said opening to suction means and a poppet valve for sealing said opening, the arrangement being such that with said opening connected to the suction means a label is held in position at the centre of said one mould part during the introduction of mouldable material between said mould parts, said valve subsequently being closed.

2. Apparatus according to claim 1 including an opening in the centre region of the other mould part and means for connecting it to suction means and a poppet valve for sealing said second opening.

3. Apparatus according to claim 1 including means for biasing said poppet valve to an open position, the biasing means being such that said valve is closed by the pressure of mouldable material introduced between said mould parts.

4. Apparatus for moulding gramophone records including two separable mould parts which define a mould cavity when not separated, a nozzle for introducing mouldable material between said mould parts, said nozzle having an axial bore therethrough terminating in an open end with tip of said nozzle extending into said cavity, a counterpiece co-operable with said nozzle tip, and means operable after the introduction of an appropriate quantity of mouldable material between said mould parts for causing said nozzle tip and said counterpiece to close together intermediate the surfaces of a record to form the centre hole in the record.

5. Apparatus according to claim 4 including an opening in the centre region of one mould part, means for connecting said opening to suction means and a poppet valve for sealing said opening, said nozzle extending through said poppet valve.

6. Apparatus according to claim 4 including an opening in the centre region of one mould apart, means for connecting said opening to suction means and a poppet valve for sealing said opening, said counterpiece extending through said poppet valve.

7. Apparatus for moulding gramophone records including two separable mould parts which define a mould cavity when not separated, a nozzle for introducing mouldable material between said mould parts, said nozzle having an axial bore therethrough terminating in an open end with the tip of said nozzle extending into said cavity, a counterpiece co-operable with said nozzle tip, means for causing one mould part to approach the other mould part without the mould parts closing together, means operable after the introduction of an appropriate quantity of material between said mould parts for causing said mould parts to close together and means for causing the closing together of said nozzle tip and said counterpiece intermediate the surfaces of a record to form the centre hole in the record.

8. Apparatus according to claim 7 including an opening in the centre region of one mould part, means for connecting said opening to suction means and a poppet valve for sealing said opening, said nozzle extending through said poppet valve.

9. Apparatus according to claim 7 including an opening in the centre region of one mould part, means for connecting said opening to suction means and a poppet valve for sealing said opening, said counterpiece extending through said poppet valve.

References Cited

UNITED STATES PATENTS

| | | | |
|---|---|---|---|
| 2,743,478 | 5/1956 | Harlow et al. | 18—5.3 P |
| 3,329,997 | 7/1967 | Rand et al. | 18—5.3 P |
| 3,474,494 | 10/1969 | Damm et al. | 18—5.3 P |
| 3,526,690 | 9/1970 | Bachman | 18—5.3 PX |
| 3,528,127 | 9/1970 | Damm et al. | 18—5.3 P |
| 3,557,406 | 1/1971 | Strausfeld | 18—5.3 P |

J. HOWARD FLINT, Jr., Primary Examiner

U.S. Cl. X.R.

264—90; 425—252, 245, 149